April 7, 1931.  W. C. DE ROO  1,799,358
SAFETY CATCH MECHANISM
Filed Sept. 9, 1927
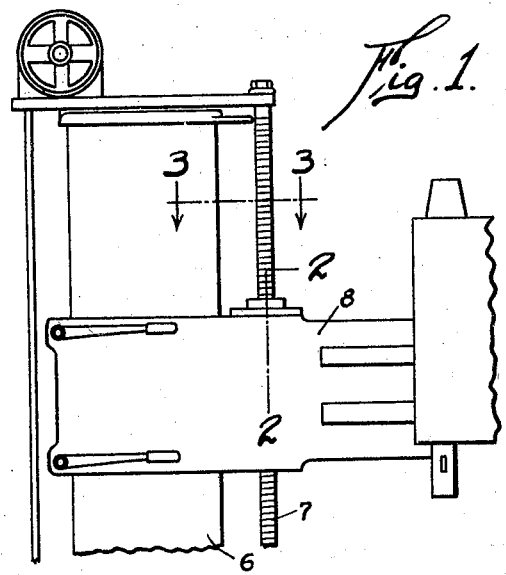
Fig. 1.
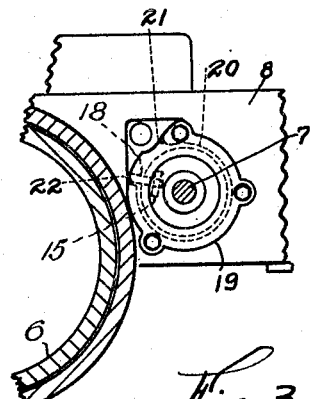
Fig. 3.
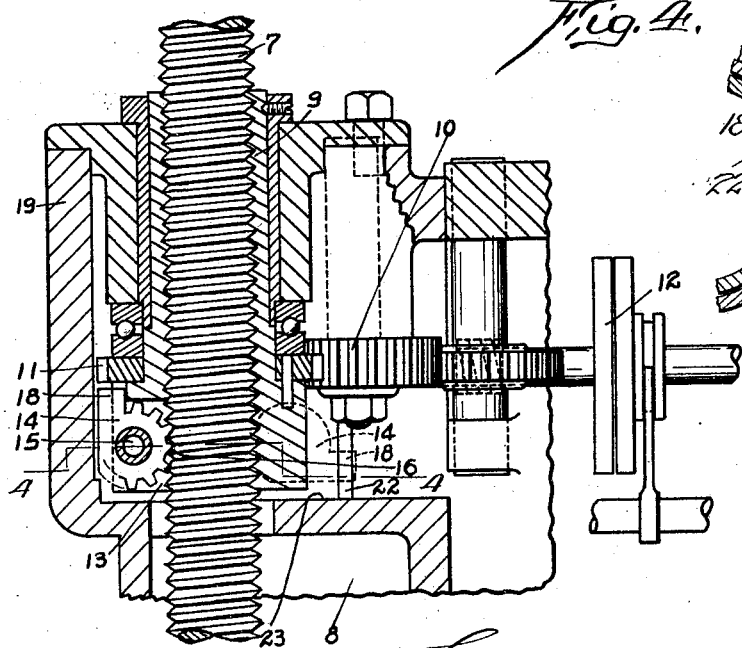
Fig. 4.
Fig. 2.
Inventor
William C. De Roo,
By Murray and Zugelter
Attorneys Patented Apr. 7, 1931

1,799,358

UNITED STATES PATENT OFFICE

WILLIAM C. DE ROO, OF CINCINNATI, OHIO, ASSIGNOR TO THE FOSDICK MACHINE TOOL COMPANY, OF CINCINNATI, OHIO, A CORPORATION OF OHIO

SAFETY-CATCH MECHANISM

Application filed September 9, 1927. Serial No. 218,560.

This invention relates to a safety catch for use in connection with an elevating mechanism such as is used in machine tools and especially in radial drills.

An object of the invention is to provide a safety catch adapted to be carried by a rotatable nut which co-operates with a fixed elevating screw for raising and lowering a drill head, radial drill arm or similar part of a machine tool.

Another object is to provide a safety catch of the type referred to which has normally a nonbearing relation with its associated parts but which, immediately upon breakage of the threads in the elevating nut, assumes an operative connection with the lead screw and then stops descent of the head or arm with which it is connected.

Another object is to provide a safety catch of this kind which is inexpensive to manufacture and which furthermore is automatic in function.

These and other objects are attained by the means described herein and disclosed in the accompanying drawings, in which:—

Fig. 1 is a fragmental elevational view of a device having embodied therein the safety catch of the invention.

Fig. 2 is a cross sectional view taken on line 2—2 of Fig. 1.

Fig. 3 is a fragmental cross section taken on line 3—3 of Fig. 1.

Fig. 4 is a view taken on line 4—4 of Fig. 2, showing, in full lines the catch of the invention operatively positioned to arrest descent of a drill arm.

In the present embodiment the device of the invention is applied to the arm of a radial drill press wherein the usual column 6 and fixed elevating screw 7 have associated therewith radial arm 8. An elevating nut 9 engages the fixed screw 7 and is adapted to be power driven through a gear 10 meshing with a gear 11 fixed to the nut. The gear 10 receives its power from a suitable transmission which is controlled in this embodiment by a friction clutch 12. The body of the nut 9 has a longitudinal slot 13 which extends radially through the body of the nut at the lower end thereof. The safety catch 14 is pivotally mounted on a pin 15 which extends into the body of the nut on opposite sides of the slot 13. The catch 14 has a gear toothed edge 16, the teeth of which extend between the threads on the elevating screw, but which normally have no bearing thereon. Thus it will be seen that the catch 14 can not rotate about its bearing on the pin 15 except in the event of bodily non-rotating descent of the elevating nut relative to the screw. An integral lug 18 on the catch 14 projects beyond the periphery of the tooth portion and under normal conditions remains vertical. The arm 8 has a substantially cylindrical housing 19 which incases the elevating nut 9 and its bearing, the cylindrical wall 20 being cut away to provide an opening bounded by vertical edges 21 and 22 of the wall 20. Base 23 of housing 19 is disposed closely adjacent the bottom of the elevating nut 9. The edge 22 constitutes abutment against which the lug 18 of the safety catch may engage when, upon failure of threaded engagement, the nut begins bodily non-rotating descent on the screw. At such times the teeth on edge 16 of the catch are rendered operative on the threads of screw 7 and act as a substitute for the threads on nut 9 so that limited rotary movement is imparted to the nut. The catch 14 with lug 18 is at this moment tending to rotate on its axis, but is precluded from doing so by the inner face of wall 20 until the lug has cleared the edge 21 of the opening. The lug 18 being then freed of resistance, the catch will make a one-quarter turn on its axis and will be projected through the opening and assume an outwardly extending horizontal position. It will then be carried by the nut against the abutment edge 22 which forms a wall of the opening through which the catch has just been projected. This stops further movement of the nut and holds the head against descent. It will be noted that under no circumstances will there be more than a portion of one revolution of the nut between the failure of threaded engagement and the locking thereof by the catch against the abutment.

The operation of the device is as follows: When the threads on elevating nut 9 are in good condition the power transmitted through gear 10 rotates the nut, elevating or lowering the arm 8 according to the direction of rotation. At this time the safety catch 14 is in the position shown in full lines at the left of Fig. 2, namely with the lug 18 in upright position. As the nut is rotated the safety catch 14 travels bodily with the nut and the teeth on the catch have no actual bearing on the screw 7 although the catch is precluded from turning about its axis by reason of such teeth extending between the threads on the elevating screw 7. Assuming that the threads on the elevating nut 9 have become badly worn after a long period of use and should break either while the machine is in operation or at any other time, the tendency will be for the arm 8 to drop. As soon as the engagement of the threads on the nut 9 with threads on screw 7 fails, the teeth on catch 14 engage with the threads on the screw thereby tending to rotate the catch about its pivotal mounting. The inner face of the wall 20 will preclude such movement until the catch 14 passes beyond the edge 21 of the wall. The catch will now rotate about its axis as the arm moves downwardly so that the lug will project outwardly beyond the edge 21 of wall 20 whereupon the catch will move through a short arc into abutment with the edge 22 on the opposite side of the opening in the wall. This abutment locks the nut against further movement, and should it be under power at the time, friction clutch 12 will slip so that no damage to the parts results. At this time the catch is in the position shown in dotted lines at the right hand side of Fig. 2. The device remains locked against further elevating or lowering of the arm until the machine is repaired thus precluding the possibility of injury to one who might endeavor to operate the machine prior to its repair.

What is claimed is—

1. In a device of the class described the combination of a vertically movable member, a fixed elevating screw, a nut revolubly mounted on the movable member whereby said member is raised and lowered on the screw, a safety catch pivotally mounted in the nut and having teeth thereon meshed in normally non-bearing relation with the screw, said catch being movable about its pivotal mounting to project beyond the body of the nut upon abnormal longitudinal movement of the nut over the screw, and means on the movable member adapted to preclude rotation of the nut when the catch is in the last mentioned position.

2. In a device of the class described the combination of a fixed screw, a movable member, a nut associated with the movable member and rotatable for effecting raising and lowering of the movable member on the screw, a toothed catch pivotally mounted on the nut and adapted to be moved about its pivotal mounting upon failure of threaded engagement of the nut and screw, to abut the movable member for locking the nut against movement on the screw.

3. In a safety device the combination of a fixed non-rotating screw, a member adapted to be raised and lowered on the screw, a nut on the screw and revolubly mounted on the member, an abutment on said member adjacent the nut, and a pivotally mounted catch adapted to be moved about its pivotal mounting against the abutment upon failure of threaded engagement of the nut and screw, whereby to hold the nut against rotation.

4. In a safety device for a radial drill arm the combination with such arm, a nut revolubly mounted in the arm, a fixed screw threaded in the nut for supporting the arm, a catch pivotally mounted in the nut and having a geared portion in normally non-bearing engagement with the screw whereby upon breakage of the threads on the nut, the geared portion of the catch may engage in bearing relation with the screw for moving the catch about its pivotal mounting into abutment with the body of the arm whereby the nut is locked against further rotation and the arm is locked against movement relative to the screw.

5. In a device of the class described a fixed non-rotating screw, a member adapted for movement longitudinally of the screw, a nut on the screw and rotatably mounted in the member, and a catch journalled on the nut adapted to become operative upon failure of threaded engagement of the nut and screw to preclude rotation of the nut and to engage the screw and member for precluding movement of said member relative to the screw.

6. In a safety device a non-rotating screw, a nut on the screw, a catch journalled on the nut adapted to engage the threads on the screw upon failure of threaded co-operation between the nut and screw and means co-operating with the catch when in the last mentioned position to arrest relative movement of the nut and screw.

In testimony whereof, I have hereunto subscribed my name this 2nd day of September, 1927.

WILLIAM C. DE ROO.